United States Patent [19]
Yates et al.

[11] Patent Number: 6,114,269
[45] Date of Patent: Sep. 5, 2000

[54] PROCESS FOR PREPARING CHEMICALLY MODIFIED MICAS FOR REMOVAL OF CESIUM SALTS FROM AQUEOUS SOLUTION

[76] Inventors: Stephen Frederic Yates, 1539 S. Kennicott Dr., Arlington Heights, Ill. 60005; Irene DeFilippi, 208 E. Edgewood La., Palatine, Ill. 60067; Romulus Gaita, 6646 Davis Rd., Morton Grove, Ill. 60053; Abraham Clearfield, Department of Chemistry, Texas A&M University, College Station, Tex. 77843; Lyudmila Bortun, Department of Chemistry, Texas A&M University, College Station, Tex. 77843; Anatoly Bortun, Department of Chemistry, Texas A&M University, College Station, Tex. 77843

[21] Appl. No.: 09/479,822

[22] Filed: Jan. 7, 2000

Related U.S. Application Data

[63] Continuation of application No. 08/892,785, Jul. 15, 1997, abandoned.

[51] Int. Cl.[7] ............................. B01J 21/16; C01B 33/42
[52] U.S. Cl. ......................... 502/84; 502/80; 423/328.1; 423/328.2; 423/328.3; 423/334
[58] Field of Search ................................. 502/80, 85, 84; 423/328.1, 328.2, 328.3, 334

[56] References Cited

U.S. PATENT DOCUMENTS

| | | |
|---|---|---|
| 3,674,521 | 7/1972 | Noble . |
| 4,176,090 | 11/1979 | Vaughan et al. . |
| 4,441,905 | 4/1984 | Malmedier et al. . |
| 4,808,318 | 2/1989 | Komarneni et al. . |
| 5,248,644 | 9/1993 | Johnson et al. . |
| 5,330,734 | 7/1994 | Johnson et al. . |
| 5,376,604 | 12/1994 | Iwasaki et al. . |
| 5,880,054 | 3/1999 | Johnson et al. . |

FOREIGN PATENT DOCUMENTS

| | | |
|---|---|---|
| 0 240 359 | 4/1987 | European Pat. Off. . |
| 0 628 7014 | 12/1993 | Japan . |

OTHER PUBLICATIONS

Wahlberg, J.S. et al. "Adsorption of Cesium on Clay Minerals", Geological Survey Bulletin 1140A (1962).
Dyer A et al. "Cation and Anion Exchnge Properties of Pillared Clays" pp. 75–84, 1990.
Mortland, Soil Sci. Soc. Am. Proc., vol. 22, pp. 503–508, 1958.
Robert et al., "Role of Iron in Mica Weathering", Iron in Soils and Clay Minerals, J. Stucki et al., pp. 585–623, 1988.
Komarneni et al., Science, vol. 239, pp. 1286–1288. "A Cesium–Selective Ion Sieve Made by Topotactic Leaching of Phlogopite Mica." Mar. 1988.
Johnson et al. "Preparation of Zirconia–Pillared Fluormicas," Chem. Mater., vol. 5, pp. 36–42, 1993.

*Primary Examiner*—Steven P. Griffin
*Assistant Examiner*—Christina Ildebrando
*Attorney, Agent, or Firm*—Jay P. Friedenson; Marie L. Collazo

[57] ABSTRACT

A chemically modified mica composite formed by heating a trioctahedral mica in an aqueous solution of sodium chloride having a concentration of at least 1 mole/liter at a temperature greater than 180 degrees Centigrade for at least 20 hours, thereby replacing exchangeable ions in the mica with sodium. Formation is accomplished at temperatures and pressures which are easily accessed by industrial equipment. The reagent employed is inexpensive and non-hazardous, and generates a precipitate which is readily separated from the modified mica.

15 Claims, 3 Drawing Sheets

X-RAY DIFFRACTION POWDER PATTERNS FROM 4 TO 10° IN 2θ SHOWING THE EXPANSION OF THE BIOTITE LAYERS FROM 10.4A TO HIGHER VALUES AS A FUNCTION OF THE NaCl SOLUTION USED TO REPLACE K+ BY Ns+

KINETICS OF MICA CONVERSION INTO SODIUM FORM

PROCESS FOR PREPARING CHEMICALLY MODIFIED MICAS FOR REMOVAL OF CESIUM SALTS FROM AQUEOUS SOLUTION

This application is a continuation of U.S. patent application Ser. No. 08/892,785 filed Jul. 15, 1997 now abandoned.

BACKGROUND OF THE INVENTION

1. Field of the Invention

This invention relates to a chemically modified mica composite having a layered structure, and more particularly to mica composites which exhibit ion exchange properties, and are particularly designed to be excellent ion exchangers for cesium.

2. Description of the Prior Art

Ever since nuclear weapons were first produced at the end of World War II, large amounts of nuclear waste have been generated and stored at various facilities. The nuclear waste, which consists largely of the byproducts of uranium and plutonium production and purification, was disposed of in ways which were deemed suitable at the time, but which in retrospect are now inadequate. Much of the nuclear waste is now stored in tanks as a highly alkaline mixture of salts and liquids which, if not recovered and properly remediated, will potentially create severe environmental problems.

Most of the stored aqueous nuclear waste is alkaline (pH 14), and contains high concentrations of sodium nitrate. The tanks contain various complexing agents, fission products, transuranic elements and other materials. Much of the stored nuclear waste is in the form of sludge created when alkali was added to the waste to prevent tank corrosion. Some of the radioactive material has been incorporated into salt cakes which is the evaporative product of the alkaline aqueous material. It is desired to remove the radioactive elements from the waste in order to allow for subsequent safe disposal of the non-radioactive materials. The removal of two of the metallic radionuclides, cesium and strontium, is particularly important because their half-lives are long enough to represent a hazard for an extended period of time.

Use of layered inorganic materials to remove cesium from aqueous solution is known to those in the art. J. S. Wahlberg and M. J Fishman *Adsorption of Cesium on Clay Minerals,* Geological Survey Bulletin 1140-A (1962) describe adsorption of cesium on several clays, though no micas.

Dyer and Gallardo in *Recent Developments in Ion Exchange* pp. 75–84 (1990) reported the use of bentonite clays as ion exchange materials and measured cesium uptake capacities. However, they did not show that any significant selectivity exists for cesium over sodium. They also reported pillaring of these clays with zirconium.

Preparation of sodium form micas from the naturally occurring potassium micas is known to be extremely difficult. Mortland (*Soil Sci. Soc. Am. Proc.* (1958) 22 503–508) leached a mica sample with large volumes of 0.01N sodium chloride and was able to extract most of the potassium from it, but the procedure is clearly not scaleable for industrial use. Robert and Pedro (*Int. Clay Conf. Proc. (Tokyo, Japan)* (1969) 1, 455–473) used sodium cobaltonitrite to extract potassium from biotite samples. Six successive treatments were required, and this number of treatments, and the expense of the reagent makes this route unattractive for large scale use. Scott and Amonette ("Role of Iron in Mica Weathering" *Iron in Soils and Clay Minerals,* J. Stucki ed. (1988) 584–623) have similarly used sodium tetraphenylborate to precipitate the potassium as it is removed from the mica, thereby improving the efficiency of the removal operation. However, this procedure results in a mixture of two solids, the potassium tetraphenylborate and the mica, and these solids are then difficult to separate. The expense of the reagent also makes this route unattractive for large scale use.

Komarneni and Roy (*Science* 239, 1286 (1988)) disclosed that micas prepared by the Scott/Amonette method are effective for the removal of cesium from aqueous solutions containing sodium. They did not disclose any more effective methods for the preparation of this material, nor did they disclose that partial or complete ion exchange of the sodium ions by other larger cations increases the selectivity of the material.

Increasing the interlayer spacing of micas by insertion of silica pillars is described in J. W. Johnson and J. F. Brody (U.S. Pat. No. 5,330,734 (1994)), and with alumina pillars in European Patent Application 0240359 B1. Preparation of zirconia-pillared fluormicas is disclosed in Johnson et al. in *Chem. Mater.* 5, 36–42 (1993). Sekimoto, Kondo and Saiki (JP 06287014 (1993)) disclose the intercalation of quaternary ammonium salts into clays or micas. However none of these references disclose the advantages that these modifications to mica have on the performance of the material as an ion exchanger for cesium.

SUMMARY OF THE INVENTION

The present invention provides a chemically modified mica composite that exhibits superb ion exchange properties towards cesium. Generally stated, the composite has an interlayer spacing greater than 11 angstroms and is capable of ion exchanging cesium under highly alkaline solutions. It is formed by a process in which a trioctahedral mica is heated in an aqueous solution having a concentration of at least 1 mole/liter to a temperature of greater than 180° C. for at least 20 hours thereby replacing the exchangeable ions present in the mica with sodium. Optionally, the sodium ions in the mica are partially or completely replaced with cations chosen from the zirconyl cation or cations formed by treating water-soluble organic amines with aqueous acid.

In one aspect of the invention, there is provided a chemically modified mica composite having a d-spacing of greater than 11 angstroms, in which the naturally present potassium ions have been replaced by one or more of sodium, the water-soluble ammonium salts of primary or secondary amines, or zirconium-containing cations.

In another aspect of the invention, there is provided a chemically modified mica composite prepared by the treatment of biotite or phlogopite mica with an aqueous solution containing sodium chloride at a concentration greater than 1 M. The treatment is carried out at a temperature above 180° C., at autogenous pressure for a time period of at least 20 hours. Optionally, the aqueous solution contains sodium hydroxide at a concentration ranging from 0.01 to 0.1M. The quantity of sodium chloride solution must be such as to supply at least 0.5 moles of sodium per gram of mica.

In yet another aspect of the invention, there is provided a chemically modified mica composite in which the mica is first treated with an aqueous sodium chloride containing solution, as described hereinabove, and then further treated with either an aqueous solution of an organic amine, or with an aqueous solution of zirconyl chloride hexahydrate.

The chemically modified mica composites of our invention are especially suited for use as ion exchange agents for the selective removal of cesium from aqueous solution. The streams to be treated contain very low concentrations of cesium, and very high concentrations of closely related ions like sodium. To be effective in this application, the ion exchange agent must show a very high selectivity for cesium over sodium, thereby accumulating the cesium within the exchanger despite the high concentrations of competing ions. Certain chemically modified micas, in which the cations normally present in the mica have been replaced by sodium, are known to have this selectivity. Despite this knowledge, no such modified micas are available commercially, because they are too expensive to prepare on a large scale.

We have discovered a new method for production of chemically modified micas which allows them to be prepared by a method which is practical from an industrial standpoint. The method utilizes inexpensive reagents (sodium chloride and water), and is performed at temperatures and pressures which are easily accessed by industrial equipment. This method replaces conventional preparation methods, which involve treating the mica with sodium tetraphenylborate. That reagent is expensive and more hazardous than sodium chloride, and generates a solid precipitate which is difficult to separate completely from the modified mica.

We have further discovered that treating the sodium mica with aqueous solutions containing other larger cations in such a way as to partially or completely replace the sodium with the larger cations further increases the selectivity of the exchanger for cesium.

DETAILED DESCRIPTION OF THE INVENTION

Figure 1:
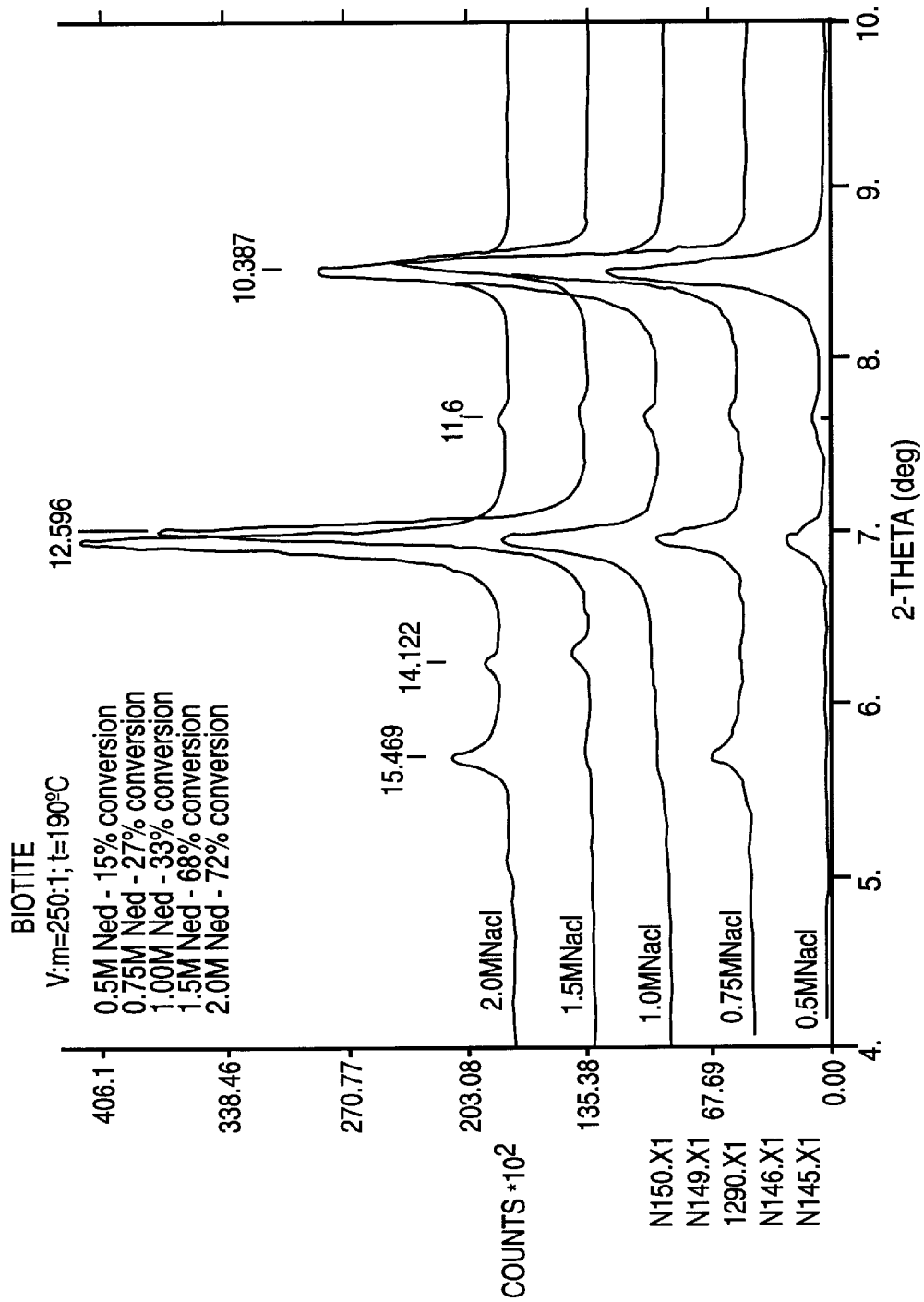
FIG. 1 shows the x-ray diffraction powder patterns showing the expansion of the biotite layers.

The present invention relates to a chemically modified mica composite having a d-spacing greater than 11 angstroms, in which the naturally present potassium ions have been replaced by one or more of sodium, the water-soluble ammonium salts of primary or secondary amines, or zirconium-containing cations. The new chemically modified micas have very high affinity and selectivity for cesium, and will remove even low concentrations of cesium from water.

The chemically modified mica materials have a layered structure, in which bilayers of sheet silicate, bound together by various divalent and trivalent ions are separated by spaces containing exchangeable cations. These exchangeable cations include sodium, the water-soluble ammonium salts of primary or secondary amines, or zirconium-containing cations. When used to remove cesium from aqueous solution, the sodium or organic ammonium cations are replaced by cesium cations. The cesium cations are sufficiently strongly bound to the mica materials that it is not possible to later remove the cesium by ion exchange.

Cesium ion-exchange affinity is measured by the cesium distribution coefficient, $K_d$. The distribution coefficient, $K_d$, is calculated using the following equation:

$$K_d=[(C_i-C_f) \div C_f] \times [V \div W]$$

where $C_i$ and $C_f$ are the initial and final solution concentrations of cesium or any other solution ion being tested, V is the volume of the starting test solution, and W is the weight of the sample tested. $K_d$ is typically reported in units of mL/g. The cesium $K_d$ is determined by contacting a known sample of mica with a solution of known cesium concentration for a controlled period of time, preferably 24 hours. Cesium $K_d$ is solution specific and for most $K_d$'s reported herein, a solution consisting of 5M $NaNO_3$/0.1M NaOH/55 ppm Cs was used. If a reported $K_d$ is derived from different cesium containing solution, then the solution composition is reported. Cesium $K_d$ is also sample size specific and unless otherwise reported, each test used 20 mL of solution and 20 mg of solid sample (V/M=1000 mL/g).

At least two physical properties are characteristic of the chemically modified mica composite of this invention with the required crystallinity to be a good strontium ion exchanger. The properties are, cesium $K_d$ and X-ray diffraction d-spacing. The latter property is derived from the X-ray diffraction pattern of the chemically modified mica composition.

The relationship between d-spacing and the X-ray angle of reflection is set forth in Bragg's Law:

$$2d \sin \theta = n\lambda$$

Where d is the d-spacing in angstroms, n is an integer, $\lambda$ is the X-ray wavelength in angstroms and $\theta$ is the X-ray angle of reflection in degrees. The Bragg's Law Equation is a useful tool for interpreting X-ray diffraction patterns since the X-ray pattern is a trace of $2\theta$.

The spacing between the mica layers is ascertained from the x-ray diffraction pattern using Bragg's Law and is known as d-spacing. Sodium mica is composed of layers of silicon, aluminum and oxygen atoms separated by voids containing sodium ions and water. The d-spacing is the distance from one silicon, aluminum or oxygen atom to the identical atom one crystal layer away. The thickness of one mica layer and one void space is the d-spacing. For optimum cesium ion exchange capacity, the sodium mica of this invention must have a d-spacing of at least 11 angstroms. A sodium mica having the requisite d-spacing admits hydrated cesium, excludes hydrated sodium, and exhibits high cesium $K_d$s (as shown by Example, 12, Table 3).

The layered structure of chemically modified mica of this invention is the source of its ability to selectively exchange cesium. The chemically modified mica composition contains spaces between the layers that are large enough to accept cesium ions. The layer spacing is small enough, however to exclude hydrated sodium and this prevents hydrated sodium from competing for ion-exchange sites with hydrated cesium. The mica thus takes advantage of the difference in heat of hydration between $Na^+$ and $Cr^+$.

The chemically modified micas of the present invention may be prepared in two steps, (1) conversion of the naturally occurring potassium micas to the sodium form, and optionally (2) conversion of the so-formed sodium micas to forms in which some or all of the sodium has been replaced by organic ammonium salts or zirconium-containing cations. Conversion of potassium micas to the sodium form is known in the prior art, but the methods used were impractical for large scale use. One aspect of the current invention is the discovery of a new easily scaleable method for the inexpensive production of sodium micas.

Micas suitable for use in the current process may be naturally occurring or synthetic micas of the trioctahedral class. Such micas have the approximate chemical composition $X_2Y_6Z_8O_{20}(OH,F)_4$, in which X is mainly K or Na, but may also be Rb or Cs, Y is mainly Al, Mg or Fe, but may also be Mn, Cr, Ti, Li etc., and Z is mainly Si or Al, but may also contain low concentrations of Fe or Ti. Examples of micas which can be used in the current process are biotite, phlogopite, zinnwaldite and lepidolite. Brittle micas, in which the X cation is a divalent cation, such as clintonite or xanthophyllite cannot be used in the process, and dioctahedral micas such as muscovite, paragonite, glauconite or margarite also cannot be used in the process.

The physical form of the micas useful in the current process is that of a fine powder, with an average particle size below 500 microns. Use of particle sizes above 500 microns leads to excessively slow reaction time. Numerous grinding methods known to those skilled in the art may be used to reduce the particle size of the mica to the appropriate size.

The aqueous solution used to convert the mica is water containing at least 1 M of sodium chloride, but cannot exceed the saturation solubility of sodium chloride in water. It must contain less than 100 ppm potassium, rubidium or cesium. Optionally, it can also contain 0.01 to 0.1 M of sodium hydroxide. Other sodium salts suited for use as a source of sodium include $Na_2CO_3$, $Na_2SO_4$, $NaNO_3$, Na(AL), and the like, which are sufficiently soluble in water to achieve at least 1 M sodium ion concentration.

Conversion of the raw material mica to the sodium form is accomplished by mixing the mica with an aqueous solution of sodium chloride with a concentration higher than 1 M in a sealed vessel, and heating this vessel to at least 180 degrees C. for at least 20 hours. The pressure developed in this vessel will be the vapor pressure of water under these conditions, normally between 120 and 180 psig. It is extremely important that the volume of sodium chloride contacted with the mica contain at least 0.5 moles of sodium per gram of mica. Use of an inadequate volume of solution, or too low a concentration of sodium will lead to low conversions.

The conversion of the raw material mica to the sodium form may be accomplished in any vessel suitable to withstand the temperatures and pressures required to complete the conversion. Examples of such vessels are steel, stainless steel, or hastalloy bombs or autoclaves. Stirring is not necessary when the volume of solution is small, but those skilled in the art will understand that it becomes beneficial as the volume of solution increases.

In one embodiment, all of the solution required to convert the mica is introduced into the vessel at the beginning of the conversion, and retained in the vessel until the conversion is complete. In another embodiment, a portion of the aqueous solution is placed in the vessel, heated for at least 20 hours, then the mixture is cooled and the solid mica is separated from the solution. New solution is then added, and the conversion is continued. In yet another embodiment, the mica is placed into the vessel with a small portion of the aqueous solution, and heated to the appropriate temperature. Additional solution is then continuously pumped into the vessel, and withdrawn at the same rate through a filter or other device for separating the particulate mica from the exiting solution. Heating of the vessel and pumping of the solution is continued until the required volume of solution has passed through the vessel.

The sodium micas prepared by the above procedures are excellent exchangers for the removal of cesium from aqueous solutions. Further improvements in cesium selectivity can be obtained by partial or complete ion exchange of the sodium with the ammonium salts derived from organic amines. Amines suitable for use in this application are those whose ammonium salts are soluble in water, and which are not so large as to fill the interlayer space. More specifically, primary or secondary amines containing 5 or fewer carbons, or diamines containing 6 or fewer carbons are used. Examples of amines which work well in the process are ethylamine, propylamine, isobutylamine, and ethylenediamine.

In one embodiment, amine micas are prepared by heating a sample of the sodium mica with a solution of the organic amine in water. Between 0.02 and 0.3 moles of amine are required per gram of mica. Temperatures for this procedure should be between 80 and 200 degrees C., and the heating time should be between 18 and 120 hours.

In another embodiment, the sodium mica is mixed with water and the ammonium salt of the organic amine. Ammonium salts suitable for this procedure must be soluble in water, and have cations which are not so large as to fill the interlayer space. Suitable ammonium salts may be prepared by mixing amines which meet the criteria noted above with suitable inorganic acids in equimolar amounts. Examples of inorganic acids which may be used in the process include hydrochloric acid, hydrobromic acid, sulfuric acid and phosphoric acid. The temperature at which the ammonium salt, water and the mica must be mixed should be between 15 and 100 degrees C., and the mixing time should be between 0.5 and 20 hours. The product solid may then be separated from the liquid by any means known to those skilled in the art.

Further improvements in the cesium selectivity of the sodium mica may also be obtained by partial replacement of the sodium ions with zirconium-containing cations. To accomplish this, the sodium mica is mixed with water, and heated to between 40 and 100 degrees C. A zirconyl chloride solution in water is then added slowly over a period of between 0.5 and 5 hours, and the mixture is then allowed to mix for an additional 1 to 48 hours. The solid product may then be separated from the liquid by any means known to those skilled in the art.

The chemically modified mica of this invention is very useful when used as an ion exchanger. In order to use the powdered chemically modified mica as an ion exchanger, it must be bound into larger particles to reduce the pressure drop in the ion exchange column and to ease handling. Any binder known in the art for binding catalysts and ion-exchangers may be used. However, the bound sodium mica of this invention is very useful in removing cesium and other radioactive waste from highly caustic aqueous solutions. So, it is preferred that the binder be selected from materials that withstand radiation and alkaline conditions, and the material should not inhibit or block cesium or other ions from entering the chemically modified mica. A composite material made up from 40 to 95 wt % of partially crystalline sodium mica with 5–60 wt % of a binder is preferred.

Both organic and inorganic binders can be mixed with partially crystalline sodium mica to make a bound ion exchange composition for cesium. For applications with nuclear waste, inorganic binders offer the advantage of increased radiation resistance. For other applications, organic binders may be easier to extrude into pellets than inorganics.

Examples of inorganic binders include silica or silica gel, silicon carbide, clays, and silicates, including synthetically prepared and naturally occurring ones, which may or may not be acid treated, for example, attapulgus clay, china clay, diatomaceous earth, fuller's earth, kaolin, kieselguhr, etc.; ceramics, porcelain, crushed firebrick, bauxite; refractory inorganic oxides such as alumina, titanium dioxide, zirconium dioxide, chromium oxide, vanadium oxide, cerium oxide, hafnium oxide, zinc oxide, magnesia, boria, thoria, silica-alumina, silica-magnesia, chromia-alumina, alumina-boria, silica-zirconia, etc.; crystalline zeolitic aluminosilicates such as naturally occurring or synthetically prepared mordenite and/or faujasite, for example, either in the hydrogen form or in a form which has been exchanged with metal cations; spinels such as $MgAl_2O_4$, $MnAl_2O_4$, $CaAl_2O_4$, and other like compounds; and combinations of materials from one or more of these groups.

Other examples of inorganic binders include various metal salts in powder, sol, or gel form, as well as graphite and hydraulic cement may be used to bind any type of sodium titanate. In addition, Ciment Fondo XR calcium aluminate, and Portland type 3 cement are good sodium mica binders with excellent strength and resistance to high alkalinity. When cements are used as binders, the bound mica can be in the form of pellets, can be fashioned with dies, or extruded.

Organic binders may also be used to bind mica. Examples of organic binders include polymers, starches, cellulose, cellulose acetate and other organic catalyst and ion-exchanger binders known in the art.

Pore formers, surface area enhancers and other materials may be added to the modified mica before, during, or after binding to improve the porosity and surface area of the bound modified mica. A preferred pore former is one which can be removed from the ion-exchanger chemically, or thermally before the bound material is used as an ion-exchanger.

A preferred binder is a hydrolyzable titanium compound. The hydrolyzable titanium compound is useful for binding any form of modified mica including sodium mica, organic ammonium mica, and the pillered zirconyl-pillered micas. A hydrolyzable titanium compound of this invention will have the formula Ti $XX_IX_{II}X_{III}$ wherein X is any constituent, $X_I$, $X_{II}$, and $X_{III}$ are each chosen from the group consisting of Cl, Br, I, or OR where R is any acyl or alkyl group containing 10 carbons and wherein R may make one or two points of contact with Ti and oxygen.

Preferred hydrolyzable titanium compounds include titanium alkoxides and especially titanium isopropoxide. The hydrolyzable titanium compound is preferably used to bind a form of crystalline sodium-mica that is a good cesium ion exchanger because the resulting titania binder has little detrimental impact on the cesium $K_d$ of the bound product. A preferred crystalline sodium mica is the mica in which greater than 50% of the sodium ions have been replaced by ethylene diammonium ions.

The hydrolyzable titanium compound, preferably titanium isopropoxide, and a crystalline sodium mica are combined and water from the air and from the crystalline sodium mica slowly hydrolyze the hydrolyzable titanium compound to form a titania bound crystalline sodium mica.

The titania bound crystalline sodium mica may be bound in the presence of an alcohol such as methanol in which case the solid should be dried before use or before further processing. The titania bound crystalline sodium mica may be dried at ambient conditions or it may be dried in an oven. In a preferred method, the titania bound crystalline sodium mica is dried in an oven at a temperature of from 75° C. to about 100° C. for a period of time ranging from about 1 hour to about 12 hours or more.

The dried titania bound crystalline sodium mica can be used as is, it can be ground and sieved into smaller particles for use as an ion exchanger, or it can be processed further to improve its mechanical properties. It is preferred that the dried titania bound crystalline sodium mica is further processed first by compaction, and then by calcination. The dried titania bound crystalline sodium mica can be compacted as produced, or it can be ground into small particles or into a powder and then compacted. It is preferred that the dried titania bound crystalline sodium mica is ground into smaller particles that can be easily compacted.

The titania bound crystalline sodium mica may be compacted in any powder compaction equipment known such as molding presses, tableting presses and extruders. Molding presses comprise a mechanically or hydraulically operated press and a two part mold attached to the platens of the press, consisting of top (male) and bottom (female) portions. The action of pressure and heat cause a particulate charge to flow and take the shape of the cavity of the mold.

Tableting presses produce simpler shapes at higher production rates than do molding presses. A single-punch press is one that will take one station of tools consisting of an upper punch, a lower punch, and a die. A rotary press employs a rotating round die table with multiple stations of punches and dies. Older rotary machines are single-sided; that is, there is one fill station and one compression station to produce one tablet per station at every revolution of the rotary head. Modern high-speed rotary presses are double-sided; that is, there are two feed and compression stations to produce two tablets per station at every revolution of the rotary head.

The titania bound crystalline sodium mica may be dry granulated. In dry granulation, the blended dry ingredients are first densified in a heavy-duty rotary tableting press which produces pellets. The pellets are subsequently crushed into particles of the size required for ion exchange. Densification can also be accomplished using a rotary compactor-granulator system. A third technique, direct compaction, uses sophisticated devices to feed the blended dry ingredients directly to a high-speed rotary press.

Roll presses can also be used to tablet the titania bound crystalline sodium mica by directing a powder feed into a gap between two rolls rotating at equal speeds. The size and shape of the compacted pellets are determined by the geometry of the roll surfaces. Pockets or indentations in the roll surfaces form briquettes from a few grams up to 5 lb. Or more in weight. Smooth or corrugated rolls produce a solid sheet which can be granulated in the desired particle size on conventional grinding equipment.

Lubricants added to the powder feed can aid in the transmission of compaction forces and reduce sticking to the die surfaces. Lubricants that are removed from the bound material at calcining temperatures may be incorporated into the titania bound crystalline sodium mica prior to compaction. Such lubricants may be selected from the group comprising boric acid, graphite, oils, soaps, starch, stearic acid, and waxes. A preferred lubricant is stearic acid and it is preferably present in the powder compactor feed in an amount ranging from about 0.1 to 4.0 weight percent.

The compaction step should produce a compact particle or pellet having a piece density ranging from about 1.5 to about 2.5 g/ml. It is most preferred that the compressed titania bound crystalline sodium mica particle has a piece density ranging from 1.8 to 2.2 g/ml.

The compacted titania bound crystalline sodium mica particles are calcined at a temperature ranging from about 150° C. to about 500° C. for a period of time ranging from 30 minutes to 10 hours or more. It is preferred that the particles are calcined in air at a temperature of from 200° C. to about 400° C. for a period of time ranging from about 30 minutes to about 5 hours. It is most preferred that the particles are calcined in moist air at the conditions identified above.

Bound and unbound sodium mica ion exchangers are useful in removing cesium and other radioactive and non-radioactive metals from aqueous solutions by packing bound or unbound sodium mica into a column and removing target metals from the aqueous streams which are fed into the column. Using this configuration, sodium mica can remove metals from large volumes of aqueous solutions. Furthermore, bound sodium mica is able to remove cesium from aqueous streams having a pH of at least 9.95 up to 13 or more, and a Na ion molarity of from about 1.0 to about 5.0 or more without significant loss of exchanger capacity or physical integrity.

When used in processing nuclear waste, the ion-exchange columns should be made out of glass, and may be lined with a polymer for caustic protection. Once the exchanger is spent, the sodium mica, along with the glass column can be vitrified to act as an impervious barrier for the radioactive cesium.

EXAMPLES

The following examples are presented to provide a more complete understanding of the invention. The specific techniques, conditions, materials, proportions and reported data set forth to illustrate the principles and practice of the invention are exemplary and should not be construed as limiting the scope of the invention.

Example 1

A one gram sample of biotite of ideal composition $K(Mg, Fe^{2+})_3Si_3(Al^{3+}, Fe^{3+})(OH, F)_2$, and with a particle size of less than 0.5 mm was added to a 500 ml teflon lined steel pressure vessel together with 250 ml of 1 M sodium chloride solution. The mixture was kept at 190° C. for 24 h, cooled rapidly and filtered and washed with distilled water. The extent of conversion, R, was determined from the relative intensities of the 001 reflection(s) of the sodium ion mica versus the intensities of the (001) reflections of all the mica samples in the sodium and potassium forms (eq. 1).

$$R = \frac{I_{12.6} + I_{15.5}}{I_{12.6} + I_{15.5} + I_{10.4}} \times 100\% \quad (1)$$

where $I_{10.4}$ is the intensity of the $K^+$-biotite with 001 reflection at d=10.4 Å and $I_{12.6}$, $I_{15.5}$, are the intensities of the expanded sodium biotite peaks. For this example R=33%, that is 33% of the $K^+$-biotite, was converted to the sodium ion form.

Example 2

In this example the concentration of sodium chloride was varied from 0.5 M to 2.0 M with the remainder of the conditions kept constant. The results are shown in FIG. 1. This figure shows the X-ray diffraction patterns from 4° to 10° in 2θ. It is seen that the amount of conversion to the sodium ion phase increases with increase in the concentration of the NaCl solution as shown in Table 1. Four expanded layer 001 peaks appear in some of the patterns at 11.6, 12.6, 14.1 and 15.5 Å. Therefore, the value of R in equation (1) needs to be modified as follows $$R = \frac{\sum I_{EX}}{\sum I_{EX} + I_{10.4}} \quad (2)$$

where $\Sigma I_{EX}$ is the sum of the intensities of all the expanded layer sodium mica phases and $I_{10.4}$ has the same meaning as in Example 1.

TABLE 1

Percent Conversion of K-Biotite to Na-Biotite as a Function of Sodium Chloride Concentration T = 190° C., V:m = 250 ml/g.

| NaCl Molarity | % Conversion R |
|---|---|
| 0.5 | 16 |
| 0.75 | 27 |
| 1.0 | 33 |
| 1.5 | 68 |
| 2.0 | 72 |

Example 3

In this example different amounts of NaOH were added to the sodium chloride solution so that the solutions were 0.02 to 1 M in NaOH in addition to I M in NaCl. Once again the conditions were the same as in Example 1 and the results are shown in Table 2.

TABLE 2

Percent Conversion of K-Biotite to Na-Biotite Resulting from NaOH Additions to the NaCl Solution Conditions: T = 190, V:m = 250:1, 1 M NaCl solution

| NaOH Conc | %-Conversion R |
|---|---|
| 0 | 33 |
| 0.02 | 49 |
| 0.05 | 48 |
| 0.1 | 32 |
| 1.0 | 0 |

The optimum NaOH concentration lies between 0.02 and 0.05 M.

Example 4

In this example the effect of temperature on the conversion of K-biotite to Na-biotite was determined. The conditions were V:m=250:1, Time=24 h, Conc, NaCl=2 M. The extent of conversion was as follows: T=140° C., R=~9%; T=190° C., R=72%; T:=240° C., R=64%.

Example 5

The influence of consecutive treatments on the conversion of K-biotite to Na-biotite was determined under the same conditions as in Example 1. In the first treatment the percent conversion was 33%. The second treatment of the partially converted sample increased the conversion to 70%. The conversion yield was not further increased by 4 more treatments.

Example 6

Figure 2:
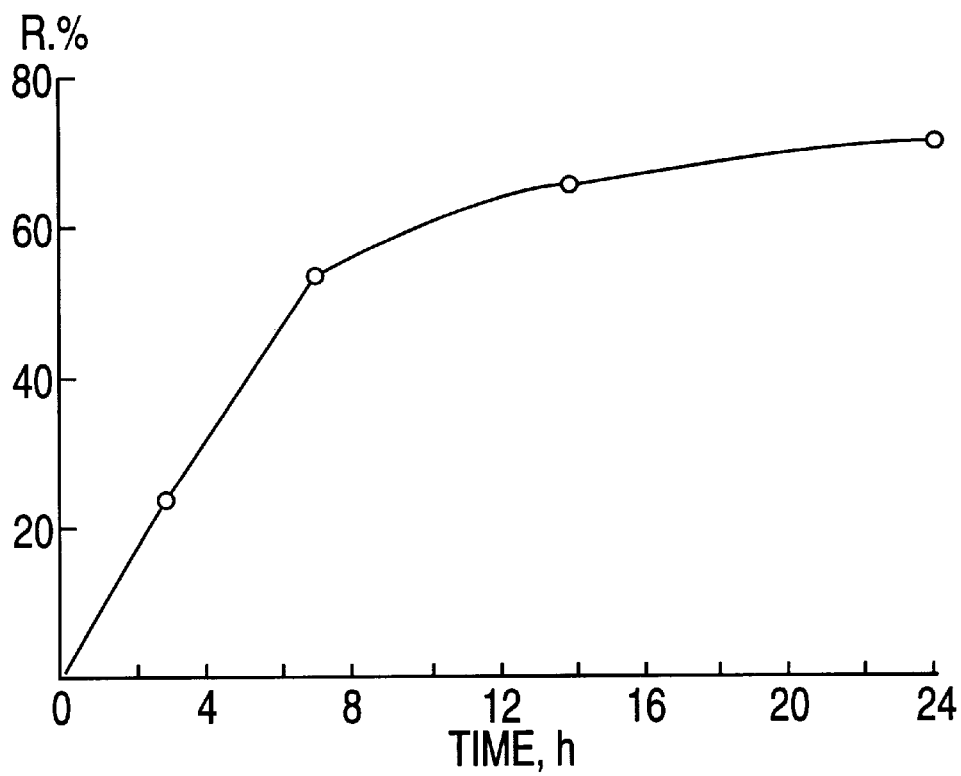
FIG. 2 shows the kinetics of mica conversion into sodium form.

In order to show the effect of time on yield, the experimental conditions were as in example #1 except that the concentration of sodium chloride was 2 M and the time was varied from 3 to 24 hours. The results, recorded in FIG. 2, show that the value of R increases from 24% at 3 hr. to 72% at 24 h. The slope up to 7 h (R=54%) rises rapidly and then the rate slows achieving 72% after 24 h.

Example 7

The effect of particle size on the reaction was determined by sedimenting out a fraction of the biotite mica that was less than 0.147 mm in size and leaving a sample that had particles in the range of 0.147–0.5 mm. The conditions were 2M NaCl, T=180°, V:m=250:1. The finer particle sized sample had a higher conversion by ~10% than the coarser sample.

Example 8

A sample of biotite (1 g) of particle size less than 0.5 mm was treated in a teflon lined bomb with 250 ml of a solution 2M in NaCl and 0.02 M in NaOH at 190° C. V:m 250:1, T=24h. The conversion was better than 90%.

Example 9

A sample of 1 g of potassium phlogopite with particle sizes between 0.15 and 0.5 mm was treated hydrothermally under the following conditions: T=180° C., t=274 hr, a solution of 2M NaCl+0.02 M NaOH, V:m−200. At the completion of the time period the teflon lined steel vessel was quenched in cold water, the solid filtered off and washed with water. The conversion to sodium phlogopite was only 5%.

Example 10

Figure 3:
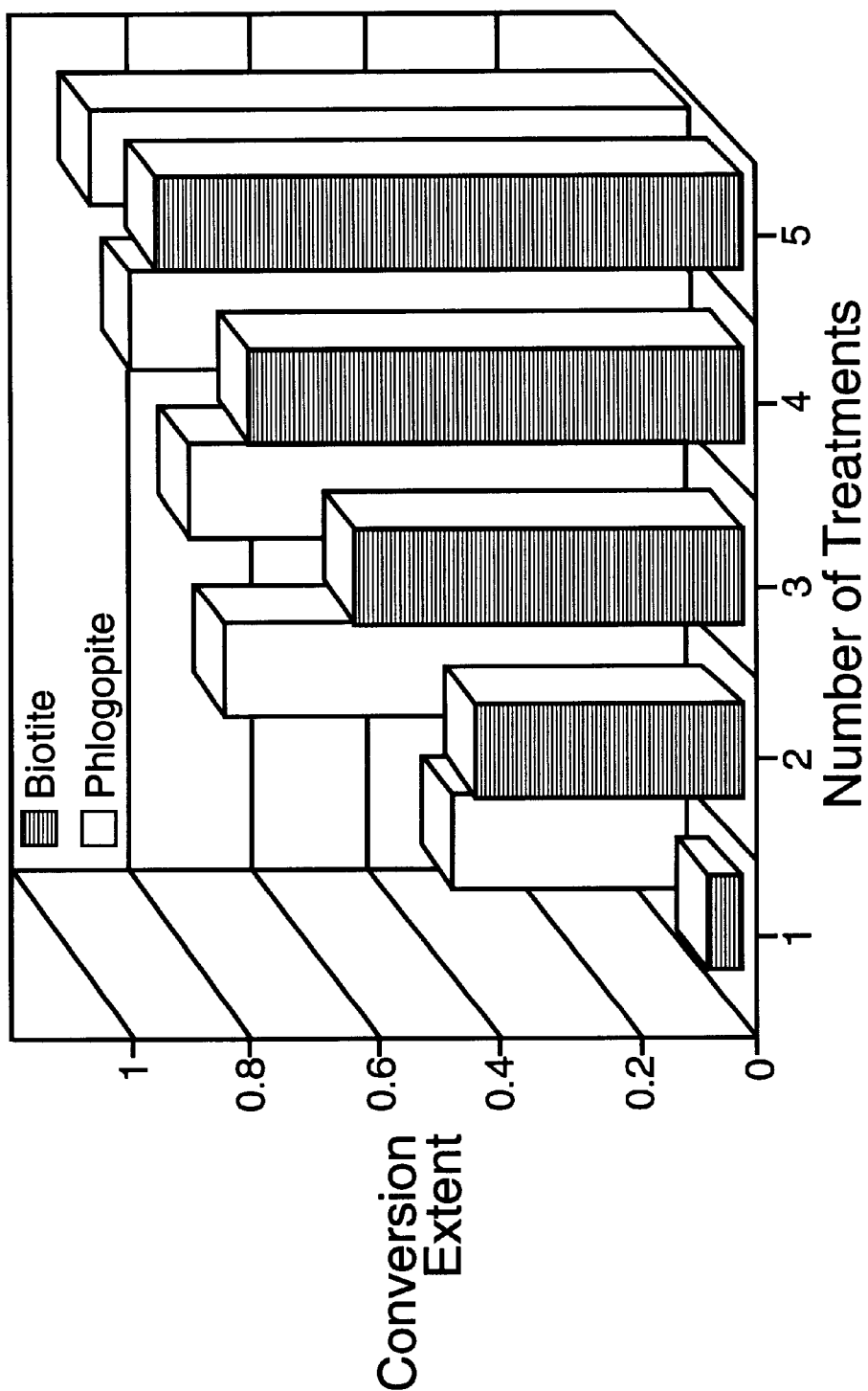
FIG. 3 shows the extent of conversion of the biotite and phlogopite versus the number of treatments.

The product of Example 9 was retreated several times in an exactly similar way four more times. The results are shown in FIG. 3 and compared to results with biotite treated in the same way. The results were as follows.

| Trial No. | 1 | 2 | 3 | 4 | 5 |
|---|---|---|---|---|---|
| % Conversion Biotite | 25 | 65 | 70 | 82 | 92 |
| % Conversion Phlogopite | 5 | 40 | 62 | 90 | 97 |

The forgoing examples show that nearly complete conversion of potassium micas to sodium micas, with expanded layer spacings, in which the sodium can be exchanged for other ions can readily be prepared.

A convenient way of measuring the selectivity of an ion exchanger for a particular ion is through measurement of the distribution coefficient, Kd.

$$Kd = \frac{(C_i - C_f)}{C_f} V/m$$

where $C_i$ is the initial concentration of the ion containing solution and $C_f$ is the concentration of the ion in solution remaining at equilibrium.

Example 11

One hundred milligrams of Na-biotite, K-biotite, Na-Phlogopite and K-phlogopite were placed in separate containers. To these solids were added 20 ml of a 0.001 M solution of CsCl. The mixtures were then shaken for 3 days to ensure that equilibrium was attained. The solids were then removed from the solutions by filtration and analyzed for $Cs^+$ by atomic absorption spectroscopy. The results are shown in the first column labeled $H_2O$ in Table 3. It is seen that practically no exchange occurs with the K-micas but complete exchange was obtained with both Na-micas.

Example 12

Example 11 was repeated but this time electrolytes $NaNO_3$ or NaOH were added to the solutions. Once again Kd values for Cs were measured for the mica samples. Even in 5 M $NaNO_3$ and 5 M $NaNO_3$+1 M NaOH significant amounts of Cs+ were taken up by the sodium micas (Table 3). For example a Kd of 500 mL/g corresponds to an uptake of 71% $Cs^+$.

TABLE 3

Distribution Coefficient Values for Cesium Adsorption from Model Solutions Containing 0.001 M Cs on Mica Samples.

| Mica | $H_2O$ | 0.1 M $NaNO_3$ | 1 M $NaNO_3$ | 5 M $NaNO_1$ | 1 M NaOH | 5M $NaNO_3$ + 1 M NaOH |
|---|---|---|---|---|---|---|
| Bio-tite-K | 1.5 | <5 | <5 | <5 | <5 | <5 |
| Bio-tite-NA | >400,000 | >100,000 | 14,300 | 750 | — | 450 |
| Phlogo-pite-K | 10 | <5 | <5 | <5 | <5 | <5 |
| Phlogo-pite-Na | >400,000 | >100,000 | 6,250 | 500 | 500 | 120 |

Example 13

A groundwater simulant was prepared containing 100 mg/L $Mg^{2+}$, 15 mg/L $Na^+$, 4.7 mg/L $Sr^{+2}$, and 6 mg/L $Cs^+$. To 100 mg of Na-phlogopite was added 100 ml of this groundwater simulant (V:M=1000). The mixture was shaken for 4 days and the amount of $Cs^+$ remaining in solution determined by atomic absorption spectroscopy (AAS). The amount was below the detectable standard for AAS and therefore is greater than 200,000 ml/g. This experiment was repeated with a fresh sample of groundwater but with the same sample of Na-phlogopite. The result was the same, $Cs^+$ could not be detected in the filtrate. This process was repeated for a total of 12 L/g with no detectable $Cs^+$ in the treated groundwater simulant. This experiment shows that Na-phlogopite is very suitable for removal of radioactive $Cs^+$ from contaminated groundwater.

Example 14

A 1 g sample of Na-phlogopite was added to 50 ml of a 2 M solution of butylamine. The mixture was shaken at room temperature for 24 h. An X-ray powder pattern showed that the interlayer spacing had increased from 12.6 Å to 18.1 Å. Thermogravimetric analysis indicated that one mole of amine per formula weight of mica had been incorporated between the layers. When the same experiment was carried out with K-phlogopite, the interlayer spacing did not change from its original value of 10.3 Å. No amine was intercalated.

Example 15

A 9.84 g sample of sodium biotite was added to 1000 mL of distilled water in a 2 L glass round bottom flask, and stirred at room temperature overnight. The stirred mixture was then heated to 60 degrees C. A solution of 2.51 g of zirconyl chloride octahydrate in 100 mL of water was added to this heated mixture over a one hour period. The reaction mixture was stirred at 60 C. for an additional 2 hours, and then stirred at room temperature overnight. Filtration of this mixture provided a solid which contained 5.48% Zr, 0.75% Na and 0.68% K. This material had a Kd for cesium of 196 mL/g, measured under the conditions of Example 12.

Example 16

A 250 mL round bottom flask was charged with 10.03 g of sodium biotite, and equipped with a magnetic stirbar and condenser. To this flask was added 28.85 g of 70% aqueous ethylamine and 39 g of distilled water. The reaction mixture was heated at reflux for three days, then cooled and filtered with suction. The product was rinsed with water, and dried in a vacuum oven at 60 C. for 24 hours. The product was then ground to less than 100 mesh particle size. The distribution constant for cesium was measured against a standard solution containing 4M sodium nitrate, 0.1M sodium hydroxide and 45.2 ppm cesium nitrate. The results are shown in Table 4.

Example 17

A 250 mL round bottom flask was charged with 10.00 g of sodium biotite, and equipped with a magnetic stirbar and condenser. To this flask was added 19.84 g of isobutylamine and 46 g of distilled water. The reaction mixture was heated at reflux for three days, then cooled and filtered with suction. The product was rinsed with water, and dried in a vacuum oven at 60 C. for 24 hours. The product was then ground to less than 100 mesh particle size. The distribution constant for cesium was measured against a standard solution containing 4M sodium nitrate, 0.1M sodium hydroxide and 45.2 ppm cesium nitrate. The results are shown in Table 4.

Example 18

A 250 mL round bottom flask was charged with 10.07 g of sodium biotite, and equipped with a magnetic stirbar and condenser. To this flask was added 20.06 and 39 g of distilled water. The reaction mixture was heated at reflux for three days, then cooled and filtered with suction. The product was rinsed with water, and dried in a vacuum oven at 60 C. for 24 hours. The product was then ground to less than 100 mesh particle size. The distribution constant for cesium was measured against a standard solution containing 4M sodium nitrate, 0.1M sodium hydroxide and 45.2 ppm cesium nitrate. The results are shown in Table 4.

Example 19

A sample of 3.08 g of sodium biotite and 500 mL of 1M methylamine hydrochloride was shaken together in a plastic bottle for one hour. The mixture was then filtered, and the solids retained. These solids were then again shaken with a second 500 mL quantity of the amine hydrochloride for one hour, and again filtered. The solid product was dried in a vacuum oven at 60 C. overnight.

Example 20

A sample of 3.09 g of sodium biotite and 500 mL of 1M ethylamine hydrochloride was shaken together in a plastic bottle for one hour. The mixture was then filtered, and the solids retained. These solids were then again shaken with a second 500 mL quantity of the amine hydrochloride for one hour, and again filtered. The solid product was dried in a vacuum oven at 60 C. overnight.

Example 21

A sample of 3.04 g of sodium biotite and 500 mL of 1M ethylenediamine hydrochloride was shaken together in a plastic bottle for one hour. The mixture was then filtered, and the solids retained. These solids were then again shaken with a second 500 mL quantity of the amine hydrochloride for one hour, and again filtered. The solid product was dried in a vacuum oven at 60 C. overnight.

Example 22

A sample of 3.01 g of sodium biotite and 500 mL of 1M propylamine hydrochloride was shaken together in a plastic bottle for one hour. The mixture was then filtered, and the solids retained. These solids were then again shaken with a second 500 mL quantity of the amine hydrochloride for one hour, and again filtered. The solid product was dried in a vacuum oven at 60 C. overnight.

Example 23

A sample of 3.21 g of sodium biotite and 500 mL of 1M isobutylamine hydrochloride was shaken together in a plastic bottle for one hour. The mixture was then filtered, and the solids retained. These solids were then again shaken with a second 500 mL quantity of the amine hydrochloride for one hour, and again filtered. The solid product was dried in a vacuum oven at 60 C. overnight.

TABLE 4

Distribution Constants for Amine Biotites Measured Against a Solution of 4M Sodium Nitrate, 0.1M Sodium Hydroxide and 45.2 ppm Cesium Nitrate (V:m = 200 mL/g)

| Sample | Distribution Constant (mL/g) |
| --- | --- |
| Example 16 | 575 |
| Example 17 | 503 |
| Example 18 | 511 |
| Example 19 | 428 |
| Example 20 | 423 |
| Example 21 | 527 |
| Example 22 | 468 |
| Example 23 | 468 |

Example 24

A 1000 mL stainless steel autoclave was equipped with a heating jacket, internal thermocouple, stirrer, an entry port and an exit port equipped with a back pressure regulator. The exit port was so positioned as to be immersed in the reaction mixture, and was fitted with a stainless steel frit with a pore dimension such that mica particles could not exit the vessel. This autoclave was charged with 50 g of phlogopite mica powder and 500 mL of 2M sodium chloride solution. The autoclave was then heated to 250 degrees C. Once this temperature was reached, 2M sodium chloride solution was pumped into the autoclave at a flow rate of 25 mL/min, and the back pressure regulator was adjusted such that a flow of solution was removed from the exit port at a similar flow rate. This process was continued until 22.5 L of solution had passed through the reactor. The autoclave was then cooled, and the reaction mixture was filtered by suction and dried. The product was more than 90% converted to the sodium form.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A process comprising:
heating a trioctahedral mica in an aqueous solution of sodium chloride having a concentration of at least 1 mole/liter, wherein the concentration does not exceed the saturation solubility of sodium chloride in water and the quantity of sodium chloride solution supplies at least 0.5 moles of sodium per gram of mica, at a temperature greater than 180 degrees Centigrade for at least 20 hours, thereby replacing exchangeable ions in the mica with sodium ions; and
separating sodium mica from solution.

2. The process of claim 1, further comprising partially replacing the sodium ions with cations chosen from zirconyl cation or cations formed by treating water-soluble organic amines with aqueous acid.

3. The process of claim 1, further comprising completely replacing the sodium ions with cations chosen from zirconyl cation or cations formed by treating water-soluble organic amines with aqueous acid.

4. The process of claim 1, wherein the trioctahedral mica is a member selected from the group consisting of biotite and phlogopite.

5. The process of claim 1, wherein the aqueous solution additionally contains 0.01 to 0.1 moles/liter sodium hydroxide.

6. The process of claim 1, wherein the sodium mica has an interlayer spacing greater than 11 Angstroms.

7. A process comprising:
   (i) heating a vessel containing trioctahedral mica in an aqueous solution of sodium chloride having a concentration of at least 1 mole/liter, wherein the concentration does not exceed the saturation solubility of sodium chloride in water and the quantity of sodium chloride solution supplies at least 0.5 moles of sodium per gram of mica, at a temperature greater than 180 degrees Centigrade for at least 20 hours;
   (ii) continuously passing the aqueous solution of sodium chloride through the vessel until a volume of solution sufficient to convert the trioctahedral mica has passed through the vessel; and
   (ii) separating sodium mica from solution.

8. The process of claims 1 or 7 wherein the aqueous sodium chloride solution has a concentration of at least 2 mole/liter.

9. The process of claims 1 or 7, wherein the trioctahedral mica has an average particle size of less than 500 microns.

10. The process of claims 2 or 3, wherein the sodium ions in the mica are replaced with zirconyl cation.

11. The process of claims 2 or 3, wherein the sodium ions in the mica are replaced with cations formed by treating water-soluble organic amines with aqueous acid.

12. The process of claim 11, wherein the organic amines are selected from the group consisting of primary or secondary amines having five or fewer carbons and primary or secondary diamines containing six or fewer carbons.

13. A process for improving the cesium selectivity of a sodium mica, the process comprising:

heating a mixture of sodium mica and water;

adding to the sodium mica and water mixture a zirconyl chloride solution in water under conditions sufficient to replace sodium ions in the sodium mica with zirconyl cations to form zirconyl cation containing mica; and separating solid zirconyl cation containing mica from solution.

14. The process of claim 13 wherein the mixture of sodium mica and water is heated to a temperature between 40 and 100° C.

15. The process of claim 13 wherein the zirconyl chloride solution comprises zirconyl chloride hexahydrate or zirconyl chloride octahydrate.

* * * * *

UNITED STATES PATENT AND TRADEMARK OFFICE
CERTIFICATE OF CORRECTION

PATENT NO. : 6,114,269
DATED : September 5, 2000
INVENTOR(S) : Stephen Frederic Yates et al.

It is certified that error appears in the above-identified patent and that said Letters Patent is hereby corrected as shown below:

<u>Title page,</u>
Above Item [21], insert the following:
-- [73] Assignee: Honeywell International Inc. and Texas A&M University System. --.

Signed and Sealed this

Tenth Day of September, 2002

Attest:

Attesting Officer

JAMES E. ROGAN
*Director of the United States Patent and Trademark Office*